March 12, 1968     R. H. WILLIAMS     3,372,676
CARDINAL BIRD FEEDER
Filed June 6, 1966
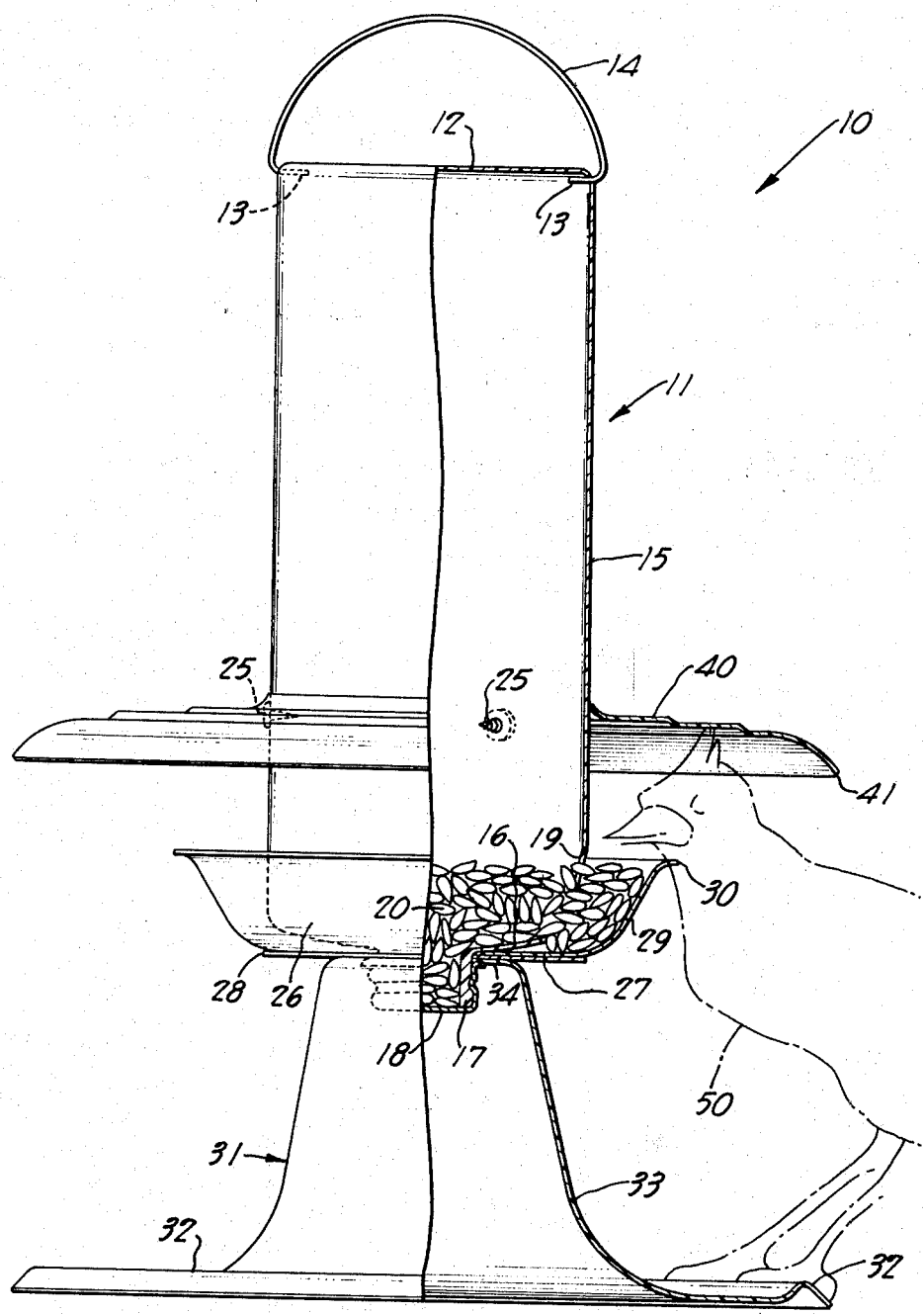
INVENTOR.
ROBERT H. WILLIAMS
BY
ATTORNEY.

United States Patent Office 3,372,676
Patented Mar. 12, 1968

3,372,676
CARDINAL BIRD FEEDER
Robert H. Williams, Rte. 2, Bandera, Tex. 78003
Filed June 6, 1966, Ser. No. 555,520
2 Claims. (Cl. 119—52)

This invention relates to bird feeding devices and particularly to a feeder for the species of red bird classified as the cardinal.

The present invention is an improvement on the cardinal feeder disclosed in my co-pending application Ser. No. 464,618, filed June 17, 1965. A particular object of the aforesaid prior invention was the provision of a feeder which would offer whole grain and particularly sunflower seed in such a manner that the same would be accessible only to the cardinal and certain other birds such as the tit-mouse, and which would be relatively inaccessible to other less welcome birds, such as sparrows. Said prior bird feeder included a vertically adjustable perch plate, the spacing between which and the feed bowl might be varied to accomplish the general purpose of the feeder.

Once the proper spacing between the feed bowl and the perch plate has been determined, however, such adjustment is not necessary and I have discovered that this may be dispensed with while still retaining the exclusive feeding features above noted and with the advantage of greatly reducing the cost of the feeder.

It is therefore an object of the present invention to provide a cardinal bird feeder which is relatively inexpensive in construction and which will have the practical effect of excluding sparrows from feeding therefrom while allowing cardinals and titmice convenient access to the grain contained therein.

The grain storage container in the aforesaid prior cardinal feeder comprised a vertically disposed cylindrical plastic bottle having at its lower end an externally threaded bottle neck of relatively small diameter through which said bottle could be filled with grain when in an inverted position, and the feed bowl provided the only element of the feeder which could be used as a funnel and had to be inverted and assembled in inverted position relative to the storage bottle in order to facilitate the introduction of grain into the bottle. This required reversing the position of the feed bowl relative to the bottle twice during the bottle-filling operation.

It is another object of the present invention to provide an improved cardinal bird feeder in which a bottle-filling hopper will be embodied with the annular bird perch of the device which takes the place of the aforesaid perch plate of said prior cardinal feeder, and which will act as a funnel for feeding the bottle upon the removal of the cap closing the aforesaid bottle neck.

The manner of accomplishing the foregoing objects as well as further objects and advantages will be made manifest in the following description taken in connection with the accompanying drawing, which constitutes a side-elevational view of a preferred embodiment of the invention which is partially in section to disclose the internal construction thereof.

Referring specifically to the drawing, the invention is there disclosed as embodied in a cardinal bird feeder 10, the principal structural element of which comprises a vertically disposed thin-walled cylindrical bottle 11 formed of plastic and having an upper end wall 12, said bottle being apertured at diametrically opposed points just below said upper wall for the reception of inwardly bent pivotal end portions 13 of a wire bail 14.

The bottle 11 includes a cylindrical shell 15 which is closed by wall 12 at its upper end and has a shallow conoidal wall 16 at its lower end, which is centrally provided with a downwardly extending externally threaded bottle neck 17 which is normally closed by a conventional screw cap 18. This cap may be formed of lacquered sheet metal, plastic or other suitable material.

Formed in the bottle 11 at the juncture of the cylindrical shell 15 and conoidal wall 16 thereof are three grain delivery holes 19 for the delivery by gravity of grain 20 which is stored in said bottle, as will be made clear hereinafter.

The cylindrical shell 15 also is provided with suitable holes through which three screws 25 are inserted inwardly for a purpose to be made clear hereinafter.

The cardinal bird feeder 10 also includes a feeder bowl 26 which is preferably formed of light sheet plastic molded into the shape shown in the drawing so as to have a flat base 27 which is reinforced by a flat disc 28, both said base and said disc being centrally apertured to loosely fit over the bottleneck 17. The feeder bowl 26 includes an annular side wall 29 which is formed upwardly at an inclined angle from the flat base 27. The upper edge of side wall 29 is slightly flared outwardly for the purpose of reinforcing this wall and providing a substantially horizontal lip 30 at the periphery of the bowl 26 on which a bird may rest its bill or neck while feeding.

The feeder 10 also includes a feeder base 31 which is preferably formed of one piece from thin sheet plastic, thermally molded into the shape shown in the drawing, and embraces an annular perch 32 which merges centrally with a frusto-conically shaped standard 33 having a horizontal wall 34 at its upper end which is centrally apertured to loosely fit over bottleneck 17.

The feed bowl 26 and feeder base 31 are united with the cylindrical bottle 11 by fitting the central apertures of these elements upwardly over the bottleneck 17 and snugly applying to the latter the screw cap 18 as shown in the drawing.

The bird feeder 10 also includes an annular centrally apertured rain shield 40 which snugly fits downwardly over the bottle 11 against screws 25 which serve as limit stops for locating said shield in the proper horizontally spaced relation with the lip 30 of the feeder bowl 26. In this preferred relationship the outer downwardly arched edge 41 of rain shield 40 is disposed at a level approximately five-eighths of an inch above the lip 30 of feeder bowl 26 and the radius of said edge 41 exceeds that of said lip by about one and one-half inches. The upper edges of grain discharge holes 19 of the bottle 11 are preferably located approximately one-eighth of an inch above the level of feeder bowl lip 30.

Another critical dimension of the cardinal bird feeder 10 is the forming of the feeder base 31 so that the annular perch 32, on which the birds perch, is spaced approximately four and five-eighths inches from the lip 30 of feeder bowl 26.

In accordance with the objects of the invention above noted, the feeder 10 permits a cardinal bird, indicated by broken lines 50, to readily alight upon the annular perch 32 and feed from feeding bowl 26. The grain 20, which is preferably sunflower seed, gravitates through holes 19 into the bowl 26 at three different points so as to keep the bowl supplied with bird seed until the reserve supply in the bottle 11 has been exhausted.

The critical dimensions given above are such as to render it difficult for certain less welcome birds, particularly sparrows, to reach the seed in the bowl 26 while standing on the annular perch 32. The sparrows are thus frustrated in any attempts they make to feed from the feeder 10 and do not interfere with the cardinal birds feeding therefrom.

Another advantage distinguishing the feeder 10 from prior bird feeders is the ease with which the supply of bird seed in the bottle 10 may be replenished. Assuming that the birds have cleaned up the seed in the feeding bowl 26, the feeder is inverted, the screw cap 18 unscrewed from the bottle neck 17 and bird seed 20 is poured into the funnel-shaped feeder base 31 so that it flows into the bottle through neck 17. When a desired quantity of seed has thus been delivered into the bottle, the wall 34 of the base 31 is lifted flush with the tip of neck 17 and the few seeds resting in said wall are pushed into the open neck, after which screw cap 18 is reapplied snugly to the bottle neck, thereby restoring the assembled relation of the parts of the feeder.

Following its reassembly, the feeder 10 is reinverted and suspended by its bail 14 in the location provided for its use.

What is claimed:

1. In a bird feeder for dispensing bird seed, the combination of:
   (A) a thin walled seed containing bottle having an axial, externally threaded neck extending downwardly therefrom;
   (B) a screw cap applied to said neck to close the latter,
   (C) there being opening means in the wall of said bottle near the lower end thereof to allow bird seed to gravitate downwardly and outwardly through said opening means;
   (D) a shallow circular feeding bowl having an axial hole in the bottom thereof fitting over said neck between said cap and said bottle;
   (E) a feeder support formed of sheet plastic to include integrally an annular peripheral bird perch, and a hollow frusto-conical standard rising upwardly and having a horizontal wall at its upper end, said wall being axially apertured to receive said bottle neck,
   (F) said cap rigidly clamping said feeding bowl and feeder support to said bottle when said cap is tightly screwed onto said bottle neck, and thus assembling said bird feeder,
   (G) said bottle being adapted to receive bird seed by inverting the feeder and unscrewing said cap, said frusto-conical standard then providing a suitable hopper for funnelling grain through said neck and into said bottle, the cap then being reapplied to said neck and the feeder turned right end up for use.

2. A feeder as recited in claim 1, wherein said bottle is cylindrical; an annular rain shield provided with a central aperture which slidably receives said bottle; and means for fixing the location of said shield on said bottle to practically exclude birds larger than a given size from feeding from said feeding bowl.

References Cited

UNITED STATES PATENTS

| 1,114,482 | 10/1914 | Johnson | 119—52 |
| 1,286,002 | 11/1918 | Hoffman | 119—52 |
| 2,521,259 | 9/1950 | Shea | 119—77 |
| 2,591,459 | 4/1952 | Meany | 119—52 |

HUGH R. CHAMBLEE, Primary Examiner.